A. B. RYPINSKI.
METER.
APPLICATION FILED MAR. 18, 1913.
1,138,690.
Patented May 11, 1915.
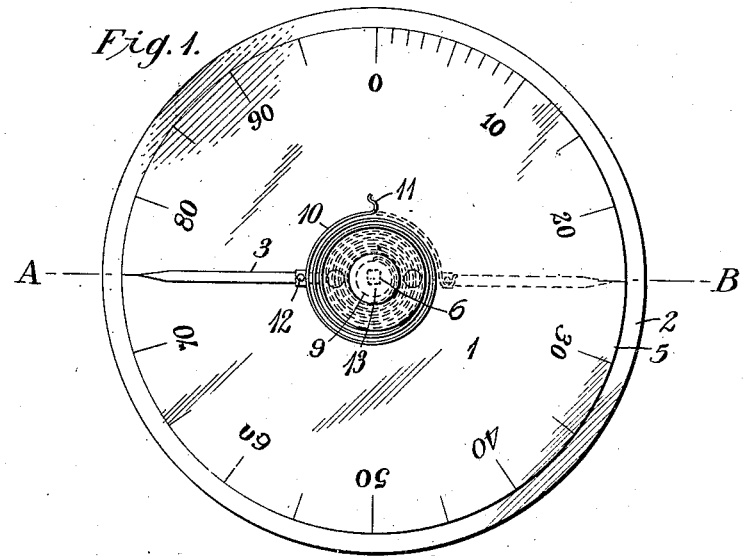
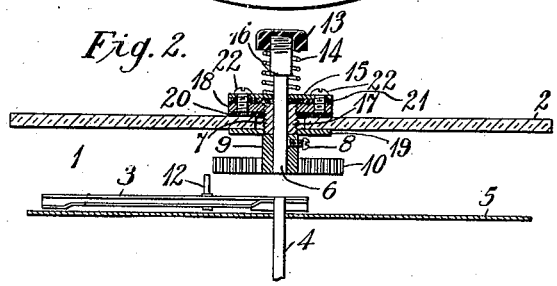
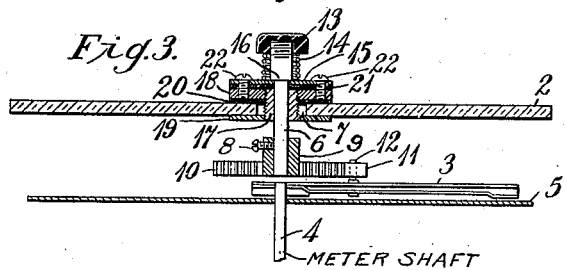

UNITED STATES PATENT OFFICE.

ALBERT B. RYPINSKI, OF NEW YORK, N. Y., ASSIGNOR TO WESTINGHOUSE ELECTRIC AND MANUFACTURING COMPANY, A CORPORATION OF PENNSYLVANIA.

METER.

1,138,690.  Specification of Letters Patent.  Patented May 11, 1915.

Application filed March 18, 1913. Serial No. 755,137.

*To all whom it may concern:*

Be it known that I, ALBERT B. RYPINSKI, a citizen of the United States, and a resident of New York city, in the county of New York and State of New York, have invented a new and useful Improvement in Meters, of which the following is a specification.

My invention relates to meters, and particularly to those instruments which may be adapted to operate either as integrating meters or as indicating meters.

The object of my invention is to provide an attachment or auxiliary device for an integrating meter by means of which the instrument may be transformed into an indicating meter.

My invention is especially applicable to portable watthour meters of the rotating standard type, whereby the instrument, when provided with a device embodying my invention, may be made to operate as an indicating wattmeter.

For a better understanding of the nature, the scope and the characteristic features of my invention, reference is had to the following description and the accompanying drawings in which—

Figure 1 is a plan view of a portion of a meter equipped with a device containing an embodiment of my invention; Fig. 2 is a sectional side view taken on the line A—B of Fig. 1, and Fig. 3 is a similar sectional side view, showing my device in an operating position, whereby the instrument is transformed into an indicating meter.

Referring to the drawings, a device 1, constructed in accordance with my invention, is mounted upon a glass plate 2 surmounting the operating mechanism of a rotating standard type watthour meter which comprises an indicator 3, supported upon a rotatably mounted meter shaft 4, and a dial 5. The axis of the meter shaft 4 is in alinement with the axis of a central shaft 6 having a square cross section. The shaft 6 projects through an opening 7 in the plate 2 in such manner as to be non-rotatable.

At the lower extremity of the shaft 6 is secured, by means of the set screw 8, an annular bushing 9 to which is attached the inner end of a tensional element or spiral spring 10. The outer end of the spring 10 terminates in a reversely curved portion or hook 11 by means of which, when the device is in operation, engagement is effected with a vertically mounted pin 12 that is secured to the indicator 3. In Fig. 1 is a plan view of the spring 10 which is shown in its normal position by full lines and in its operating position by broken lines. In Fig. 2 is shown a sectional side view of the spring in its normal position, and in Fig. 3 a view when the spring is operatively engaged with the pin 12 and the indicator 3.

To transform the integrating meter, wherein the indicator 3 is revolving about the axis of the shaft 4 and registering the time integral of the power, into an indicating meter, wherein the instantaneous value of the power may be determined, pressure is exerted upon a button 13 which is screwed to the upper extremity of the shaft 6. This causes the spring 10 to descend to a position where the hook 11 may engage the pin 12 when the said pin is in a position upon the dial where such engagement can be effected. The indicator 3 will revolve until the torsional moment offered to it by the spring 10 is equal and opposite to the impelling moment occasioned by the armature of the internal mechanism of the meter, which is not shown. The position of equalibrium attained by the indicator upon the dial 5 is a measure of the value of the power, and the meter is thus transformed into an indicating instrument. When the pressure on the button 13 is relieved, the spring 10 will be returned to its normal position by means of a compressed helical spring 14 which is positioned between the under surface of the button 13 and a face plate 15. This releases the pin 12 from engagement with the spring 10, and the instrument may operate now as an integrating meter. In order to limit the downward movement of the spring 10, the shaft 6 is provided with a shoulder 16 which prevents further downward movement of the spring after the shoulder has come into contact with the face plate 15.

The shaft 6 slidingly passes through a threaded bushing 17 which is held in the opening 7 in the glass plate 4 by means of clamping plates 18 and 19. These plates are screwed upon the bushing with the glass plate 4 and a felt washer 20 held intermediately. Disposed between the face plate 15 and the clamping plate 18 is a felt washer 21 which is firmly held by screws 22. The purpose of the felt washers is to afford mechanical protection to the glass plate 2 and to exclude dust from the mechanism.

The structural details may, of course, be varied from what I have shown and described within the scope of the appended claims.

I claim as my invention:

1. In an electrical measuring instrument comprising a rotating standard having an indicator secured thereto, a tensional element normally positioned out of engagement with the indicator, and means for effecting engagement between the indicator and the tensional element.

2. In an electrical measuring instrument comprising a rotating standard having an indicator secured thereto, a tensional element normally positioned out of engagement with the indicator, and manually operated means for effecting engagement between the tensional element and the indicator.

3. In an electrical measuring instrument, the combination with a rotating indicator, of a tensional element surmounting the indicator, and means for moving the tensional element perpendicularly to the plane of rotation of the said indicator to operatively engage the said indicator.

4. In an electrical measuring instrument comprising a rotating standard, an indicator secured thereto, a spiral spring surmounting the plane of rotation of the indicator, means for moving the spiral spring perpendicularly to the said plane of rotation, and means for effecting engagement between the indicator and the spring.

5. In an electrical measuring instrument comprising a rotating standard, an indicator secured thereto, a tensional element, and externally accessible means for effecting engagement between the indicator and the tensional element.

6. In an electrical measuring instrument comprising a rotating standard, an indicator secured thereto, a movable shaft, a spring normally positioned with one end secured to the movable shaft and the other end unengaged, and means for moving the said shaft, whereby engagement may be effected between the indicator and the unengaged end of the spring.

7. In an electrical measuring instrument, the combination with a rotatable member, of a resiliently mounted non-rotatable member, a resilient member attached to said non-rotatable member and adapted to engage said rotatable member when the non-rotatable member is depressed.

8. In an electrical measuring instrument, the combination with a rotatable member, of a non-rotatable member, a spiral spring attached to said non-rotatable member for engaging said rotatable member when the non-rotatable member is depressed.

9. In an electrical measuring instrument, the combination with an integrating meter, of a tensional member, and means for operatively connecting said tensional member to said integrating meter to constitute an indicating meter.

10. In an electrical measuring instrument, the combination with an integrating meter, of a tensional member, and manually operated means for operatively connecting said tensional member to said integrating meter to constitute an indicating meter.

In testimony whereof, I have hereunto subscribed my name this 19th day of February 1913.

ALBERT B. RYPINSKI.

Witnesses:
CELIA RYPINSKI,
W. C. RYPINSKI.